United States Patent Office 3,449,814
Patented June 17, 1969

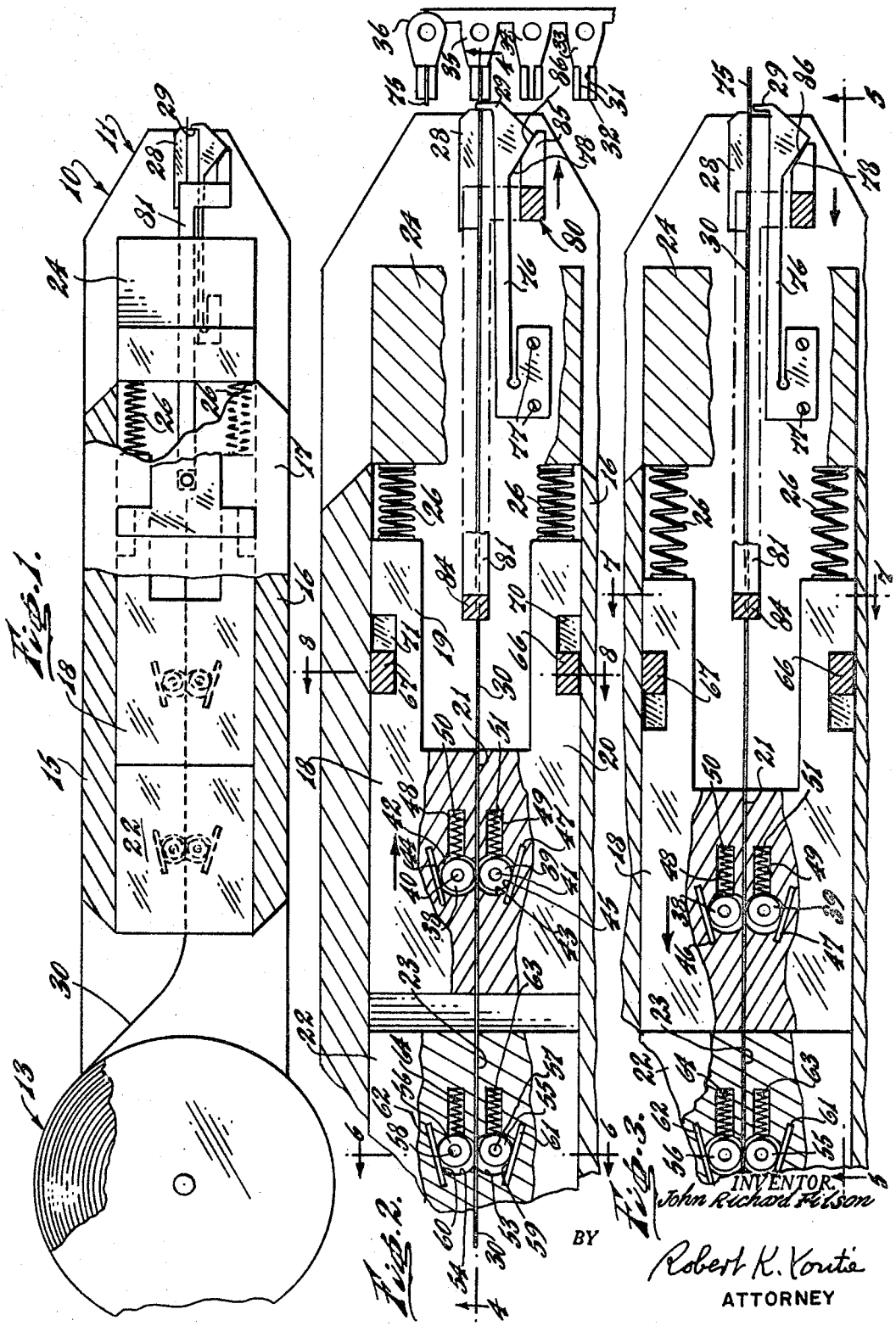

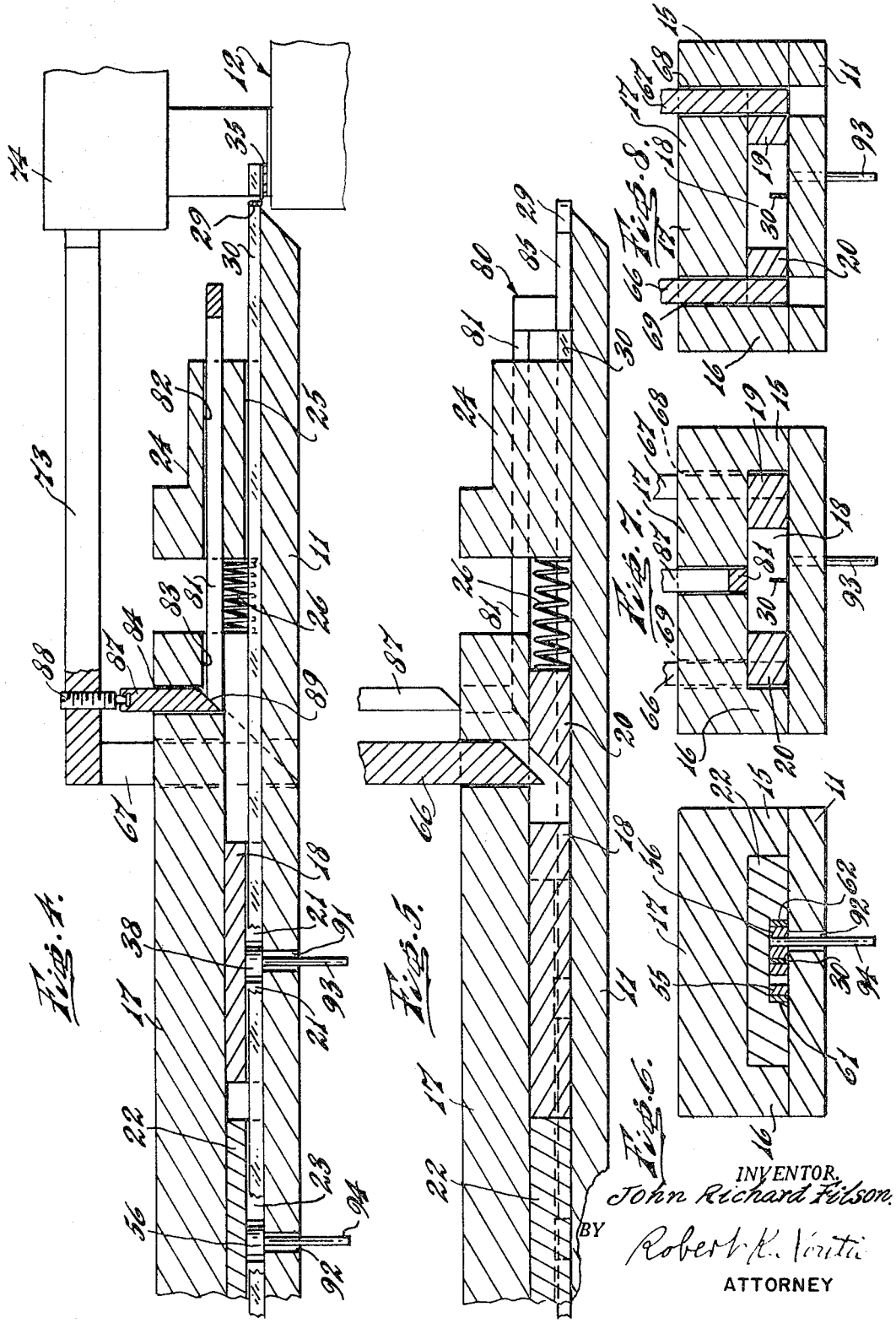

3,449,814
APPARATUS FOR INSERTING SOLDER IN CONNECTOR SLEEVE
John Richard Filson, 95 N. Lakeside Drive, Medford, N.J. 08055
Filed Apr. 17, 1967, Ser. No. 631,227
Int. Cl. B23k 3/00
U.S. Cl. 29—203                8 Claims

ABSTRACT OF THE DISCLOSURE

The instant disclosure, in essence, includes a reciprocatory carrier which carries feed means to feed solder between the ends of a connector sleeve being clinched, and cutoff means for severing the clinched solder portion.

BACKGROUND OF THE INVENTION

As is well known to those versed in the art, it is highly desirable under certain situations to employ connectors having soldered or blazed sleeves. Heretofore, the brazing or soldering of connector sleeves has involved considerable hand labor, or relatively complex and unreliable equipment.

SUMMARY

Accordingly, it is an important object of the present invention to provide an extremely simple, highly efficient and reliable apparatus for completely automatically inserting solder or brazing material between the ends of a connector sleeve to be clinched thereby.

It is a further object of the present invention to provide apparatus having the advantageous characteristics mentioned in the preceding paragraph, which is relatively simple and inexpensive in construction and adapted for association with an actuation by a conventional press being used in manufacture of the connectors.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIGURE 1 is a top view showing apparatus of the present invention in one position of operation, and partly broken away for clarity of understanding;

FIGURE 2 is a top view similar to FIGURE 1, but illustrating another condition of operation, and somewhat enlarged and partially in section for increased clarity;

FIGURE 3 is a top view similar to FIGURE 2, but illustrating the operative position of FIGURE 1;

FIGURE 4 is a longitudinal sectional elevational view taken generally along the line 4—4 of FIGURE 2;

FIGURE 5 is a longitudinal sectional elevational view taken generally along the line 5—5 of FIGURE 3;

FIGURE 6 is a transverse sectional view taken generally along the line 6—6 of FIGURE 2;

FIGURE 7 is a transverse sectional view taken generally along the line 7—7 of FIGURE 3; and FIGURE 8 is a sectional view taken generally along the line 8—8 of FIGURE 2.

DESCRIPTION OF THE PREFERRED EMBODIMENT

Referring now more particularly to the drawings, the apparatus of the present invention is there generally designated 10, and includes a generally horizontal, substantially flat base 11 fixedly supported in position by any suitable means (not shown).

The base 11 may be of elongate configuration, having one end extending generally toward a press 12, best seen in FIGURE 4. Carried on the other end of the base 11 may be supply reel 13, say of strip solder material, such as silver or the like, for a purpose appearing presently.

Fixed on the upper surface of the base 10, by any suitable fastening means, may be a pair of laterally spaced, elongate sidepieces or guides 15 and 16, extending along respective sides of the base. A generally flat cover member or plate 17 may be fixedly secured to the sidepieces or guides 15 and 16, extending there-between in bridging relation over the base 11. A blocklike carrier or slide 18 is conformably interposed between the guides 15 and 16, beneath the cover plate 17 for sliding movement on the base. That is, the carrier 18 is reciprocable longitudinally along the base 11, being guided thereon between the sidepieces 15 and 16, as between its retracted position of FIGURES 1, 3 and 5, and its extended position of FIGURES 2 and 4. The carrier or slide 18 may be of generally rectangular configuration, best seen in FIGURES 2 and 3, including a pair of laterally spaced legs 19 and 20 extending forwardly or away from the supply reel 13 along respective side guides 15 and 16. Laterally medially of the carrier 18, there may be formed therethrough an elongate slot extending longitudinally of the base 11 and opening at its opposite ends for passing a solder strip, as will appear presently.

Rearward of the carrier 18, interposed between the side guides 15 and 16, and fixed on the base 11, is an abutment member or block 22 limiting rearward movement of the carrier to a position in abutting engagement with the block, as seen in FIGURE 3. The abutment member or block 22 is formed with a thru slot or passageway 23, extending longitudinally of the base 11 and opening at its opposite ends for aligned communication with the slot 21 when the carrier is in its rearward postion of movement.

A forward abutment member or block 24 is fixed on the base 11 by any suitable means, spaced forwardly of the carrier 18 and extending laterally across the space between side members 15 and 16. The forward abutment block 24 also includes an open-ended thru slot or passageway 25, in spaced alignment with the forward end of carrier passageway 21. Resilient means, such as coil compression springs 26 may be interposed between the forward ends of carrier legs 19 and 20, and rearward surface of abutment member 24, to resiliently urge the carrier 18 rearward, to its limiting position of FIGURE 3.

Forward of the forward abutment 24, there is fixed on the base 11 a solder-strip guide 28 having a thru slot in alignment with the passageways 25, 21 and 23, and providing on its forward end a cutting edge or anvil 29.

It will now be appreciated that a solder strip 30 may extend from supply reel 13 forwardly respectively through passageways 23, 21 and 25, and guide 28, for extension therefrom into the space between ends 31 of a connector sleeve 32, see FIGURE 2. It will be appreciated that the several connectors 33, 34, 35 and 36, shown in FIGURE 2, are in the process of being formed from a single strip, as by progressive formation in the press 12.

The carrier 18 is provided with means for feeding the solder strip 30 through the passageway 21 in the form of one or more feed members 38 and 39 mounted in floating relation in the carrier adjacent to the passageway. More particularly, the feed members 38 and 39 may each be of generally circular or annular configuration, having respective center holes 40 and 41, and loosely received in respective oversize cavities 42 and 43 formed in the carrier. The cavities 42 and 43 may each be of generally circular outline configuration on opposite sides of and opening laterally to the passageway 21. The outer side of each cavity 42 and 43, remote from the passageway 21, is bounded by an oblique surface, as at 44 and 45, which surfaces may be defined by generally flat wear members 46 and 47 embedded in the carrier. Thus, each of the generally circular feed members 38 and 39 is spacedly received in its respective carrier cavity 42 and 43, the feed members having their inner sides facing toward the passageway 21, and their outer sides facing toward the respective oblique surfaces 44 and 45. The surfaces 44 and 45 are oblique to the direction of reciprocation of carrier 18, being convergent rearwardly or leftward as seen in the drawings. Extending forwardly or rightward from each cavity 42 and 43 in the carrier 18 is a bore, as at 48 and 49 respectively receiving suitable resilient means, such as coil compression springs 50 and 51 bearing rearwardly against adjacent feed members 38 and 39.

Thus, it will be appreciated that the feed members 38 and 39 are resiliently urged rearward or leftward by respective springs 48 and 49, and therefore caused to ride on respective surfaces 44 and 45 rearward and obliquely inward toward passageway 21 and into wedging engagement between the respective oblique surface and a solder strip 30 in the passageway. Forward or rightward movement of the carrier 18 accentuates or increases this wedging action to frictionally draw the solder strip 30 with the carrier, while rearward or leftward carrier movement decreases or releases this wedging action for carrier retraction without the solder strip. The feeding action is shown in FIGURE 2, and the carrier retraction is shown in FIGURE 3, being there exaggerated for clarity.

The rearward abutment member 22 is provided with a similar resilient wedging mechanism to further insure solder-strip feed in one direction only. That is, the abutment member 22 is formed with a pair of cavities 53 and 54 on opposite sides of an opening into the passageway 23, each loosely receiving a generally circular or annular holding members 55 and 56, which holding members may have central openings 57 and 58. The cavities 53 and 54 are bounded on their sides remote from the cavity 23 by rearwardly convergent, oblique surfaces 59 and 60 of wear plates 61 and 62 fixed in the abutment. Suitable resilient means, such as coil compression springs 63 and 64 are mounted in the abutment 22 in rearwardly bearing engagement with respective holding members 55 and 56, whereby the latter are normally urged resiliently rearwardly against respective oblique surfaces 59 and 60, to ride thereon laterally inward toward passageway 23.

Upon forward or feeding movement of carrier 18, as shown in FIGURE 2, the strip 30 moves with the carrier, as discussed hereinbefore, and is free to move between the holding members 55 and 56, shown in exaggerated condition in FIGURE 2. However, upon retraction of the carrier 18, the condition shown in FIGURE 3, the holding members 55 and 56 are moved into wedging engagement between their respective oblique surfaces 59 and 60, and the solder strip 30 to prevent retraction of the latter.

Motive means for effecting reciprocation of the carrier may be provided in the form of a pair of laterally spaced depending bars or feet 66 and 67 freely movable vertically through respective openings 68 and 69 in the top wall 17 (see FIGURE 8) into camming engagement with oblique surfaces 70 and 71 of the carrier legs 20 and 19. That is, the carrier legs 20 and 19 are formed with forwardly inclined surfaces 70 and 71, which are respectively engaged by the lower end surfaces of feet 66 and 67 upon downward movement thereof to effect camming action for shifting the carrier forwardly against the force of springs 26. The depending cam feet 66 and 67 may be carried by an arm 73 fixed to a plunger 74 of the press 12. Thus, upon successive operations of the press 12, the carrier 18 is reciprocated to shift the solder strip 30 forwardly for engaging a forward solder portion 75 between the ends of a connector sleeve 32. Elevation of the press plunger 74 raises the arm 73 and cam feet 67 to release the carrier 18 for return to its retracted position under the force of springs 26.

The cutter or blade 29 is carried by a resiliently flexible arm 76 extending rearwardly from the guide 28 and suitably fixed to the base 11, as by fasteners 77. Thus, the cutter 29 is swingable upon flexure of the arm 76 transversely across the path of movement of strip 30, and cooperates with the guide 28 to sever the extending strip portion 75 engaged between the ends 31 of a connector sleeve. The cutter arm 76 is provided with an oblique cam surface 78 for engagement by a cutter operator 80 to effect cutting action.

The cutter operator 80 includes a longitudinally extending elongate member or bar 81 extending slidably through an open-ended guideway 82 in the abutment member 24. The elongate member 80 extends rearwardly beneath the cover plate 17, or into a downwardly facing recess 83 of the cover plate and terminates at the lower end of a vertically extending thru hole 84 in the cover plate. Forward of the abutment member 24, the elongate member 81 is provided with a laterally and downwardly offset forward extension 85 having a cam surface 86 for camming engagement with the cutter-arm cam surface 78. That is, upon forward shifting movement of the operator 80, the operator surface 86 engages the cutter-arm surface 78 to shift the cutter 29 transversely across the path of solder strip 30 for severing the latter, against the resilient force of the operator arm. Upon release of the operator for rearward movement, the cutter arm 76 and cutter 29 return out of the path of solder movement.

The operator 80 is actuated by a foot 87 depending from the arm 73 slidably into the cover opening 84. The actuating foot 87 is carried by the arm 73 by a suitable adjustment means, such as a threaded connection 88 for adjusting the vertical position of the foot relative to the arm 73. The lower end of the actuating foot 87 may include an oblique cam surface 89 for camming engagement with the rear end of elongate operating member 81. Thus, upon reciprocation of press plunger 74, the actuating foot 87 is vertically shifted to effect longitudinal reciprocation of operator 80 for severance of the extending solder-strip portion 75.

It will now be appreciated that the solder-strip insertion device 10 of the present invention is necessarily synchronized with operation of press 12 to effect feeding of the solder strip 30 and severance of a fed solder-strip portion 75 in properly timed relation with the closing of a connector sleeve, so that the severed solder-strip portion is clinched between the closed sleeve ends.

In order to facilitate threading of the solder strip 30 through the passageways 23, 21 and 25, and removal therefrom of the solder strip, the base 11 may be provided with vertically extending thru holes, as at 91 and 92 in FIGURE 4. The hole 91 may be located directly beneath one of the feed members, say feed member 38, while the hole 92 may be located directly beneath one of the holding members, say holding members 56. Pins 93 and 94 are shown as extending spacedly through respective holes 91 and 92 for engagement in the central openings of respective members 38 and 56. By this means, the feed and holding members 38 and 56 may be displaced away from respective passageways 21 and 23 to facilitate threading therethrough of the solder strip 30. The pins 93 and 94 may be removable, or may remain attached to the members 38 and 56. Also, additional pins may be employed for manually displacing the members 39 and 55, if desired.

From the foregoing, it is seen that the present invention provides a device for inserting solder between the ends of a connector sleeve, which device fully accomplishes its intended objects and is well adapted to meet practical conditions of manufacture and use.

Although the present invention has been described in some detail by way of illustration and example for purposes of clarity and understanding, it is understood that certain changes and modifications may be made within the spirit of the invention and scope of the appended claims.

What is claimed is:

1. Apparatus for inserting solder between the ends of a connector sleeve during formation of the sleeve in a press, said apparatus comprising a base located adjacent to the press, a carrier mounted on the base for reciprocation toward and away from sleeves being formed in the press, said carrier having a passageway therethrough for receiving a length of solder material, motive means for effecting said carrier reciprocation in timed relation with operation of the press, feed means carried by said carrier for feeding successive portions of solder through said passageway into position between said sleeve ends to be gripped thereby, and cutoff means for severing the gripped sleeve portion.

2. Apparatus according to claim 1, said cutoff means comprising a cutter mounted on said base for reciprocatory movement across the path of movement of said solder, said cutter-operating means movable to operate said cutter for severing a gripped solder portion.

3. Apparatus according to claim 1, said feed means comprising resiliently biased wedge means engageable with said solder in only one direction of carrier reciprocation to effect intermittent feeding of solder in said one direction.

4. Apparatus according to claim 3, in combination with additional resiliently biased wedge means mounted on said base and engageable with said solder upon carrier movement in the other direction to resist return of solder in said other direction.

5. Apparatus according to claim 1, said motive means comprising cam means movable transversely of said carrier reciprocation for effecting the latter and adapted for operative connection to the press to be actuated thereby.

6. Apparatus according to claim 5, said cutoff means comprising a cutter mounted on said base for reciprocatory movement across the path of solder movement and resiliently biased toward one side of said path, a cutter operator shiftable on said base into and out of engagement with said cutter to move the latter across said path, and additional cam means mounted on said base for camming engagement with said cutter operator to shift the latter into engagement with said cutter, said additional cam means being adapted for operative connection to the press to be actuated thereby.

7. Apparatus according to claim 1, said feed means comprising at least one feed member mounted in said carrier for floating movement therein and having one side facing laterally into said passageway, said carrier having an oblique surface facing the other side of said feed member, and resilient means carried by said carrier and operatively connected to said feed member for urging the latter against said oblique surface for wedging action between the latter and solder in said passageway, whereby said feed member frictionally engages said solder upon carrier movement in said one direction to feed the solder and disengages the latter upon carrier movement in the other direction.

8. Apparatus according to claim 7, said additional resiliently biased wedge means comprising at least one holding member mounted in said base for floating movement therein and having one side facing laterally toward said solder, said base having an oblique surface facing the other side of said holding member, and resilient means mounted in said base and operatively connected to said holding member to urge the latter against said oblique surface for wedging action between the latter and the solder, to resist solder movement in said other direction.

References Cited

UNITED STATES PATENTS

| | | | |
|---|---|---|---|
| 1,960,067 | 5/1934 | Rippl | 228—15 X |
| 2,545,756 | 3/1951 | Andren | 29—203 |
| 3,231,961 | 2/1966 | Andren et al. | 29—33.51 |
| 3,264,860 | 8/1966 | Herb | 72—457 |
| 3,267,556 | 8/1966 | Scharf | 29—203 X |

THOMAS H. EAGER, *Primary Examiner.*

U.S. Cl. X.R.

72—457; 228—15